July 26, 1960 W. R. KLAHN ET AL 2,946,618
GRAPPLE
Filed Aug. 7, 1958 2 Sheets-Sheet 1

INVENTORS
WILLIAM R. KLAHN and
RAYMOND W. NEUPERT
By Donald G. Dalton
Attorney

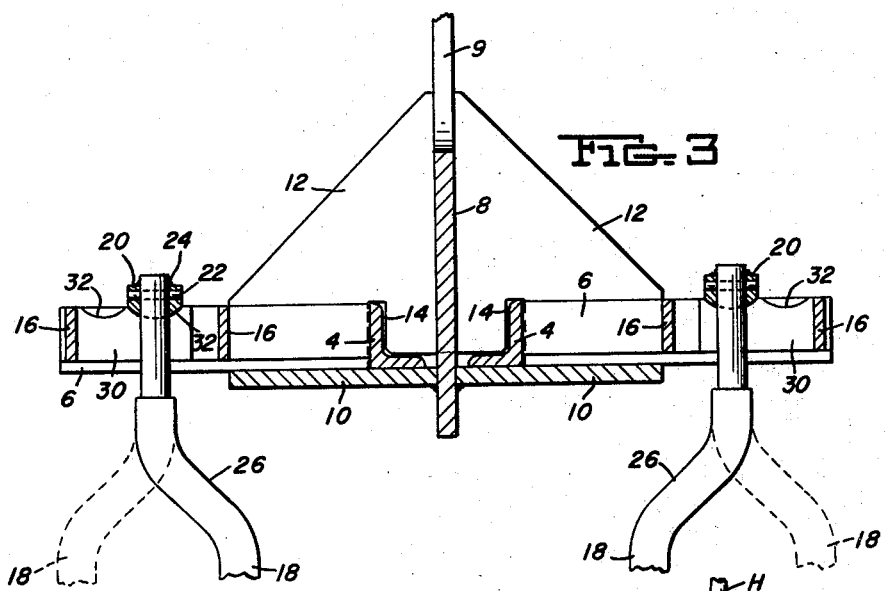
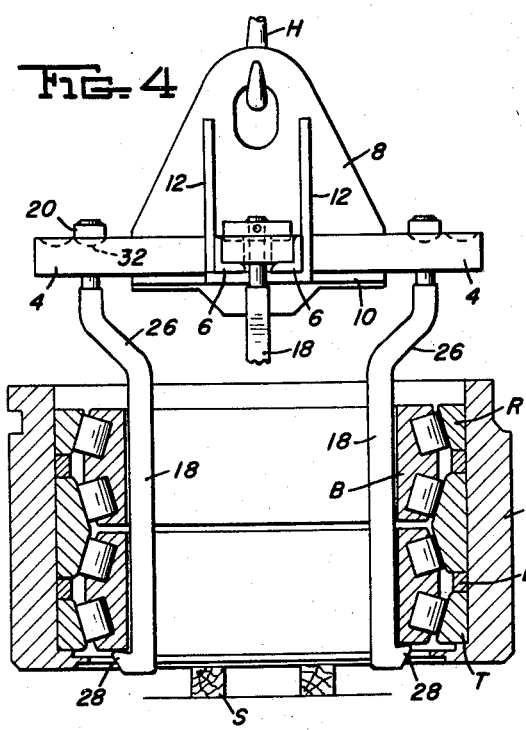
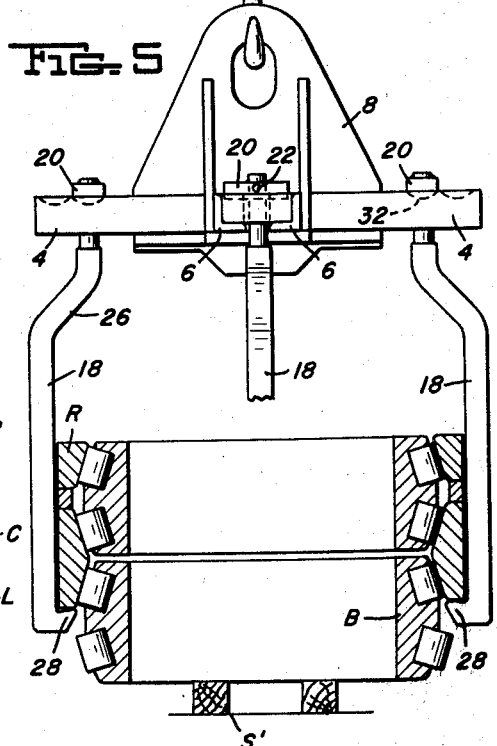

United States Patent Office 2,946,618
Patented July 26, 1960

---

2,946,618

GRAPPLE

William R. Klahn, Crown Point, and Raymond W. Neupert, East Gary, Ind., assignors to United States Steel Corporation, a corporation of New Jersey Filed Aug. 7, 1958, Ser. No. 753,767

2 Claims. (Cl. 294—67)

The present invention relates generally to apparatus for handling objects and has as its primary object the provision of an improved grapple for handling rolling mill bearings and the like.

The invention will be fully apparent from the following detailed disclosure and the appended claims when read in connection with the accompanying drawings, in which:

Figure 3 is a sectional view taken on the line III—III of Figure 2;

Figure 4 is a front elevational view showing the apparatus of the invention in engagement with the inside of a bearing preparatory to removing the bearing from its chock; and Figure 5 is a view similar to Figure 4 showing the apparatus of the invention in position preparatory to removing the outer race from the bearing after the latter has been removed from its chock.

Figure 1:
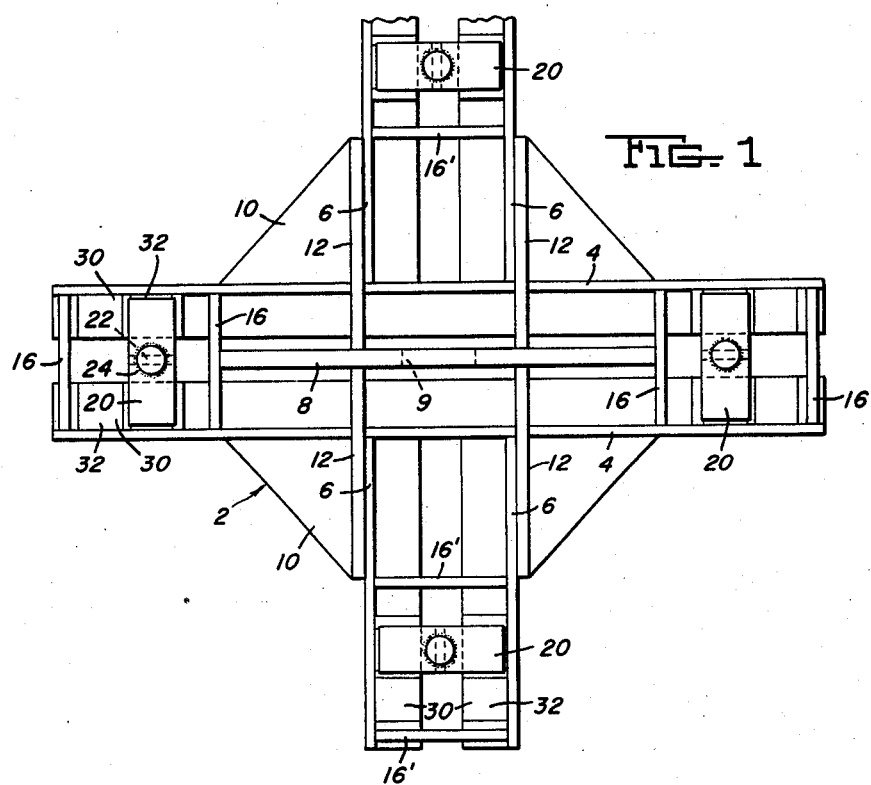
Figure 1 is a plan view.

Reference numeral 2 designates generally the frame of the invention which comprises a cruciform structure including a pair of elongated angle sections 4 arranged in opposed spaced parallel relation and two pairs of shorter angle sections 6 which are disposed in opposed parallel relation to each other and are butt welded to the upright web of each of the angle sections 4 at substantially the centers thereof. The angle sections 4 and 6 thus form a cruciform structure having arms of uniform length.

A lifter plate 8 having an opening 9 for receiving a crane hook H projects upwardly from the center of the frame 2 and is attached thereto by means of a pair of angularly shaped flat plates 10 which are welded to the underside of the angle sections 4 and 6 and butt welded to the opposite faces of the plate 8 adjacent its lower edge. Two spaced upstanding gusset plates 12 are butt welded to opposite faces of the lift plate 8 and are also welded to the upright webs of the angle sections 6 on each side of the frame 2. As shown in Figure 3, the gusset plates 12 are cut away as at 14 to accommodate the angle sections 4. The gusset plates 12 may also be welded to the contacting portions of angle section 4 to provide added strength to the frame 2. Spacer plates 16 extend between and are welded to the upstanding webs of the opposed angle sections 4 along the lengths thereof. Spacer plates 16' similar to plates 16 extend between and are welded to the opposed angle sections 6 at spaced intervals along the lengths thereof.

A hanger bar 18 depends from the end of each of the arms of the frame 2. The upper portion of each of the hanger bars 18 is provided with a bearing 20 having a rounded bottom which extends radially in opposite directions from the bar. It has been found preferable to affix the bearings 20 to the bars by means of pins 22 and welding as at 24. Each of the hanger bars is provided with a curved portion 26 so that the bottom portion of the bar is angularly offset from the top portion thereof. The bottom of each bar is formed in the shape of a hook 28 for the purpose of contacting objects to be handled as will become apparent hereinafter.

Each of the hanger bars is supported by a pair of spaced saddle plates 30 disposed adjacent the end of each of the arms of the frame 2. The saddle plates are each welded to an angle section and also extends between and is butt welded to a pair of the spacer bars 16 and 16'. Each of the saddle plates is provided with a pair of concave seats 32 in its upper surface 4 for receiving the rounded bottom portions of the bearings 20 to thus pivotally support the hanger bars 18. The saddle plates 30 are each provided with two seats 32 so as to permit limited adjustment of the hanger bars along the lengths of the arms of the frame 2 so that various size objects can be handled, as will be explained more fully hereinafter.

Figure 2:
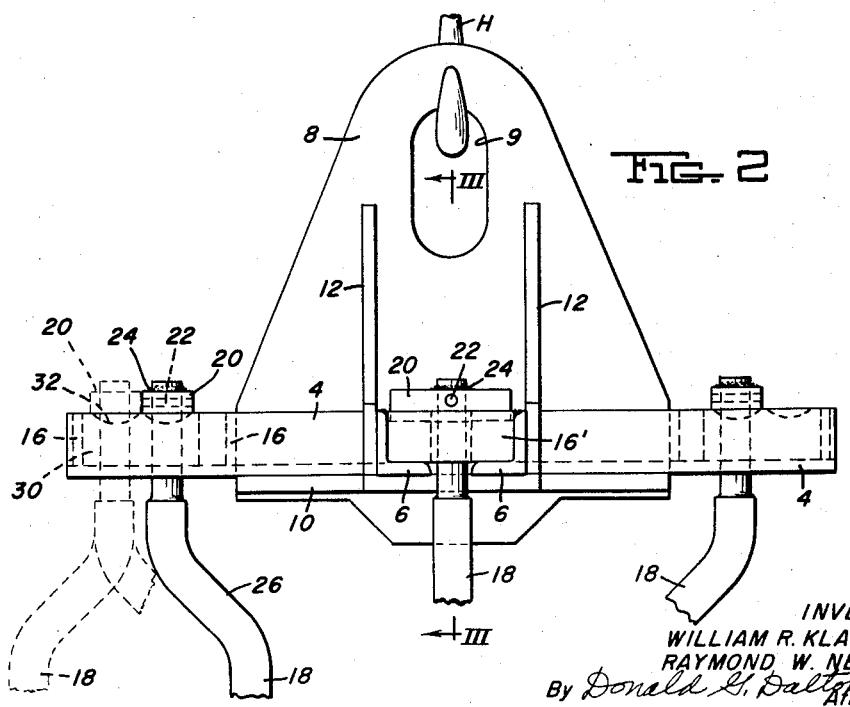
Figure 2 is a front elevational view.

Referring now to Figure 4, reference character B designates a conventional roll mill bearing mounted in a cylindrical chock C. As shown, the complete bearing with chock has been removed from a roll mill housing and deposited in upright position on a raised support S. In operation, the grapple of the invention is suspended in a horizontal plane by the hook H of an overhead crane by means of the lifter plate 8. The crane is then operated to lower the hanger bars 18, which are free to swing in their saddles, into the bore of the bearing B and the hook portions of the hanger bars are placed in engagement with the underside of the bearing B, as best shown in Figure 4. If desired, only three hanger bars may be used for this operation. The grapple is then raised to lift the bearing B out of the chock C and lower it onto another raised support S'. For the purposes of efficient handling it has been found preferable to allow the lower tapered portion T and lower ring L of the bearing to remain in the chock for subsequent manual removal after the bearing is lifted out by the grapple. After the bearing B has been deposited on the raised support S', the hanger bars 18 are removed from engagement with the underside of the bearing and lifted out of the bearing bore. Then each of the hanger bars is lifted manually to raise its bearing portion 20 from its saddle, rotated 180 degrees and reseated in the saddle. The grapple is then lowered over the bearing B with the hanger bars 18 surrounding the outside thereof. The hook portions of the hanger bars are then engaged with the underside of the outer race R of the bearing, as shown in Figure 5, and the grapple is raised to remove the outer bearing race. To accommodate a larger bearing the hanger bars 18 are moved from the inside to the outside concave seats of the saddle bars, as shown by broken lines on the left side of Figure 2. Thus, the grapple may be used to handle various size bearings or like articles and is quickly and easily adjustable for engaging the outside of an article or the inside of a bored article. If desired, the saddle plates 30 may each be provided with more than two seats so as to provide a greater degree of adjustment for the bearings of the hanger bars along the length of each arm of the frame 2.

While one embodiment of our application has been shown and described, it will be apparent that other adaptations and modifications may be made without departing from the scope of the following claims.

We claim:

1. A grapple comprising a cruciform frame having four arms adapted to be supported in a horizontal plane, each of said arms having a center opening extending longitudinally therealong, a load hanger bar carried by and depending from at least three of the arms of said frame through the openings thereof, means mounting each of said hanger bars on its respective arm for swinging movement in a vertical plane toward and away from the vertical axis of the cruciform frame, said means including an elongated bearing on each of said hanger bars extending radially in opposite directions from the hanger bar adjacent the top thereof, the bottom of each of said bearings being rounded and having an arc extending transversely of the longitudinal axis of the bearing, each of said hanger bars being adjustably positionable lengthwise of said arms, and means operatively supporting each of said hanger bars in each of its positions, said last named means comprising a pair of bearing saddles on each arm for supporting said bearing in each of said positions, the saddles in said pair being disposed adjacent opposite sides of said opening.

2. A grapple as defined by claim 1 in which the bottom portion of each of said load hanger bars is angularly offset from the top portion thereof.

References Cited in the file of this patent

UNITED STATES PATENTS

| | | |
|---|---|---|
| 718,506 | Normandin | Jan. 13, 1903 |
| 1,603,913 | Gillitzer | Oct. 19, 1923 |
| 1,730,128 | Drake | Oct. 1, 1929 |
| 1,765,023 | McWane | June 17, 1930 |
| 1,767,525 | Hoffman | June 24, 1930 |
| 1,833,545 | Wehr | Nov. 24, 1931 |
| 1,956,231 | Thomas | Apr. 24, 1934 |
| 2,441,026 | Long | May 4, 1948 |
| 2,629,128 | Blosick | Feb. 24, 1953 |
| 2,848,269 | Havens et al. | Aug. 19, 1958 |